(12) United States Patent
Bergman et al.

(10) Patent No.: US 9,128,216 B2
(45) Date of Patent: Sep. 8, 2015

(54) LIGHTING DEVICE

(75) Inventors: Anthonie Hendrik Bergman, Nuenen (NL); Bartel Marinus Van De Sluis, Eindhoven (NL); Bram Knaapen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 82 days.

(21) Appl. No.: 13/980,190

(22) PCT Filed: Jan. 20, 2012

(86) PCT No.: PCT/IB2012/050279
§ 371 (c)(1),
(2), (4) Date: Jul. 17, 2013

(87) PCT Pub. No.: WO2012/101558
PCT Pub. Date: Aug. 2, 2012

(65) Prior Publication Data
US 2013/0294104 A1    Nov. 7, 2013

(30) Foreign Application Priority Data

Jan. 25, 2011   (EP) .................................... 11152008

(51) Int. Cl.
*F21V 8/00* (2006.01)
*F21V 33/00* (2006.01)
*G09F 13/18* (2006.01)
*F21Y 101/02* (2006.01)

(52) U.S. Cl.
CPC ............ *G02B 6/0001* (2013.01); *F21V 33/006* (2013.01); *G02B 6/0078* (2013.01); *G02B 6/0095* (2013.01); *G09F 13/18* (2013.01); *F21V 2200/00* (2015.01); *F21Y 2101/02* (2013.01)

(58) Field of Classification Search
None
See application file for complete search history.

(56) References Cited

U.S. PATENT DOCUMENTS

| 6,288,700 B1 * | 9/2001 | Mori .............................. 345/102 |
| 2005/0174804 A1 | 8/2005 | Blanc |
| 2006/0248761 A1 | 11/2006 | Cheung et al. |
| 2008/0037284 A1 | 2/2008 | Rudisill |
| 2009/0310336 A1 * | 12/2009 | Yoon et al. ................... 362/97.1 |

FOREIGN PATENT DOCUMENTS

| JP | 4349403 A | 12/1992 |
| JP | 5252624 A | 9/1993 |
| JP | 2005310422 A | 11/2005 |
| JP | 2006285181 A | 10/2006 |
| JP | 2008193810 A * | 8/2008 |
| JP | 2009048939 A | 3/2009 |
| WO | 2008065614 A1 | 6/2008 |
| WO | 2009095866 A1 | 8/2009 |

* cited by examiner

*Primary Examiner* — Elmito Breval
(74) *Attorney, Agent, or Firm* — Meenakshy Chakravorty

(57) ABSTRACT

The disclosed embodiments relate to functional and decorative lighting. A transparent body (100) comprises a plurality of light guides (130, 140) forming a matrix. Light is emitted from light sources (210, 220). In the cells of the matrix in which light from different light sources (210, 220) intersects, the light is mixed which results in different cells having different colors.

8 Claims, 5 Drawing Sheets

LIGHTING DEVICE

FIELD OF THE INVENTION

The present invention relates to functional and decorative lighting.

BACKGROUND OF THE INVENTION

Luminous windows or transparent emissive windows are windows that are transparent and look like ordinary windows when turned off and are luminous, i.e. emit light, when turned on. These windows may for instance be used for general lighting or for displaying a sign or logo.

Generally, a luminous window comprises a transparent polymer material acting as a light guide, which may be lit by means of a light source. The light guide may comprise scattering elements for extracting the light out of the light guide and, for instance, directing it into a room.

When the light is turned on, the light emitted from the luminous window has the same color as the light emitted from the light source. If the sign or logo is to have a plurality of colors, a plurality of luminous windows are needed, each window being associated with a respective light source emitting a respective color. The plurality of luminous windows are then arranged next to each other, forming the sign or logo. This arrangement could be improved in terms of, e.g., flexibility. There is thus a need for more flexible arrangements.

SUMMARY OF THE INVENTION

It is an object of the present invention to overcome or alleviate problems of the prior art.

According to a first aspect of the invention, this and other objects are achieved by a lighting device. The lighting device comprises: a transparent body having a plurality of light guides extending in a first direction, wherein each light guide is delimited by slits extending in the first direction, and a plurality of light guides extending in a second direction, wherein each light guide is delimited by slits extending in the second direction, wherein the plurality of light guides extending in the first direction and the plurality of light guides extending in the second direction are arranged to intersect; a first set of light sources arranged at a first side of the transparent body, wherein the first set of light sources are arranged to emit light through the light guides extending in the first direction; and a second set of light sources arranged at a second side of the transparent body, wherein the second set of light sources are arranged to emit light through the light guides extending in the second direction.

An advantage of the body being transparent is that when the light sources are not activated, the transparent body blends in with the background, which improves the esthetic appearance.

The invention is based on the idea that when light is incident on a slit at an angle other than orthogonal to the slit, the slit functions as a mirror. Furthermore, when light is incident on a slit at an angle orthogonal to the slit, the light travels through the slit unaffected in terms of direction.

The light that is emitted from the light sources and guided through the light guides is delimited by the slits, since light which is incident on the slit at an angle other than orthogonal to the slit is reflected. Thus, the light is guided through the light guides by total internal reflection. When the light that is emitted from the light sources and guided through the light guides is incident on a slit at an angle orthogonal to the slit, the light travels through the slit with almost no disturbance in the direction of travel.

Thus, light emitted from the first set of light sources arranged at the first side of the transparent body travels through the light guides extending in the first direction and on its way, the light traverses light guides extending in the second direction. Similarly, light emitted from the second set of light sources arranged at the second side of the transparent body travels through the light guides extending in the second direction and on its way, the light traverses light guides extending in the first direction. This results in light from the first set of light sources and from the second set of light sources intersecting. These light intersections occur in the intersections formed by the light guides extending in the first direction and the light guides extending in the second direction. The intersections of the light guides in the first direction and in the second direction can be said to form cells in a matrix. In every such cell, or intersection, the light can be mixed, provided that light sources are arranged accordingly.

The lighting device may further comprise a plurality of light guides extending in a third direction, wherein each light guide is delimited by slits extending in the third direction, and a third set of light sources arranged at a third side of the transparent body, wherein the third set of light sources are arranged to emit light through the light guides extending in the third direction.

The transparent body may be made of at least one from the group of glass, silicon, and plastic. The plastic may be a transparent thermoplastic such as, e.g., poly(methyl methacrylate), PMMA.

The second direction may be orthogonal to the first direction.

The shape of the transparent body may be selected from at least one of the group of cubic, spherical, tetrahedral, icosahedral, parallelepipedal, octahedral, quadratic, circular, triangular, elliptical, and rectangular.

At least a subset of the first set of light sources, the second set of light sources, and the third set of light sources may be arranged to emit light of at least one color.

The first direction may be parallel to a perimeter of the transparent body and the second direction may be parallel to a radius of the transparent body.

The first direction may be orthogonal to the second direction.

The third direction may be orthogonal to the first direction and the second direction.

The use of light sources emitting several different colors is advantageous in that several different colors can be formed and that decorative or informative patterns can be formed in the transparent body.

The first side of the transparent body may be parallel to the second direction and the second side of the transparent body may be parallel to the first direction.

Each of the light sources of the first and second sets of light sources may comprise at least one light emitting diode. Thus, each light source can comprise one or a plurality of light emitting diodes.

The transparent body may comprise an out-coupling structure for coupling the light emitted through the light guides out of the transparent body.

According to a second aspect of the invention, the above object and other objects are achieved by a lighting system comprising a plurality of interconnected lighting devices as described above. The advantages of the first aspect are equally applicable to the second aspect. Furthermore, a lighting system comprising a plurality of interconnected lighting devices can be used as a means for both information and decoration. The plurality of lighting devices may, e.g., illustrate the status of a sleeping baby, the amount of online activity within a Hyves and/or Facebook community, or it could indicate how the weather is expected to develop in the coming hours.

According to a third aspect of the invention, the above object and other objects are achieved by a window comprising at least one lighting device as described above. The window can, e.g., be a shop window. The advantages of the first aspect are equally applicable to the third aspect. Furthermore, a window comprising at least one lighting device can be used as a means for both information and decoration. Advertisements could be displayed or warning/information messages could be submitted.

According to a fourth aspect of the invention, the above object and other objects are achieved by a signboard comprising at least one lighting device as described above. The signboard can, e.g., be an advertising signboard, or an information signboard. The advantages of the first aspect are equally applicable to the fourth aspect. Furthermore, a signboard comprising at least one lighting device can be used as a means for both information and decoration. Advertisements could be displayed or warning/information messages could be submitted.

According to a fifth aspect of the invention, the above object and other objects are achieved by a method of providing a lighting device. The method comprises: cutting, using a laser, slits extending in a first direction in a transparent body, wherein each pair of slits delimit a respective light guide extending in the first direction; cutting, using a laser, slits extending in a second direction in the transparent body, wherein each pair of slits delimit a respective light guide extending in the second direction, such that the plurality of light guides extending in the first direction and the plurality of light guides extending in the second direction intersect; arranging a first set of light sources at a first side of the transparent body so that the first set of light sources emit light through the light guides extending in the first direction; and arranging a second set of light sources at a second side of the transparent body so that the second set of light sources emit light through the light guides extending in the second direction.

The advantages of the first aspect are equally applicable to the fifth aspect. Furthermore, the fifth aspect can be embodied in accordance with the first aspect.

It is noted that the invention relates to all possible combinations of features recited in the claims.

BRIEF DESCRIPTION OF THE DRAWINGS

This and other aspects of the present invention will now be described in more detail, with reference to the appended drawings showing embodiments of the invention, in which;

FIG. 3 is a schematic illustration of the embodiment of the inventive lighting device of FIG. 1 but with some of the light sources turned on.

FIG. 5 is a schematic illustration of the embodiment of the inventive lighting device of FIG. 4 but with some of the light sources turned on.

DETAILED DESCRIPTION

Figure 1:
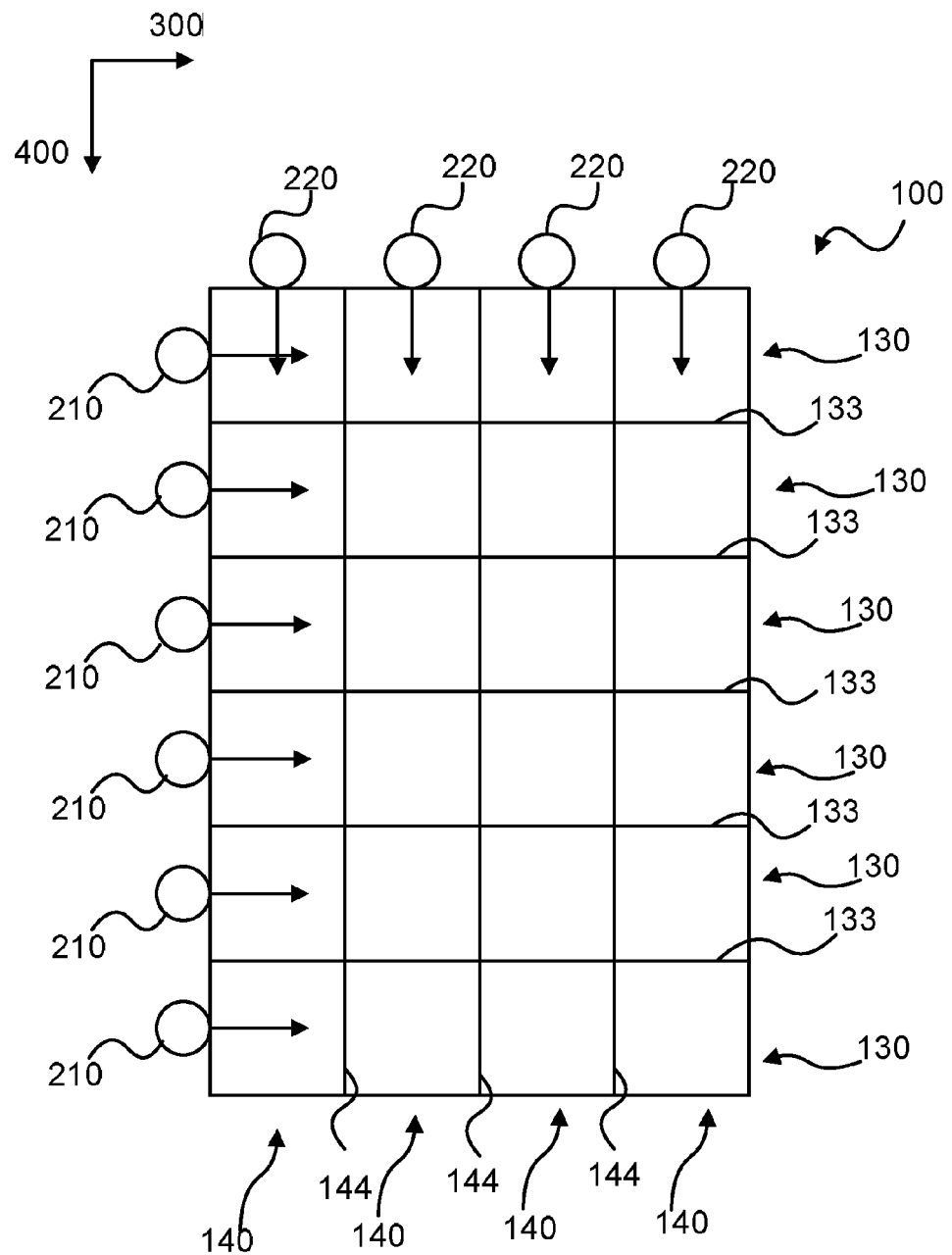
FIG. 1 is a schematic illustration of an embodiment of the inventive lighting device.

FIG. 1 is a schematic illustration of an embodiment of the inventive lighting device. A transparent plate 100 is illustrated. The transparent plate 100 can be made of, e.g., glass, silicon or plastic. The plastic used can be a transparent thermoplastic such as, e.g., poly(methyl methacrylate), PMMA. This particular transparent plate 100 is rectangular, but the skilled person realizes that different embodiments are possible.

The transparent plate 100 has a plurality of light guides 130 extending in a first direction 300, wherein each light guide 130 is delimited by slits 133 extending in the first direction 300. Furthermore, the transparent plate 100 has a plurality of light guides 140 extending in a second direction 400, wherein each light guide 140 is delimited by slits 144 extending in the second direction 400. The second direction 400 is in this particular embodiment orthogonal to the first direction 300. The plurality of light guides 130 extending in the first direction 300 and the plurality of light guides 140 extending in the second direction 400 intersect.

A first set of light sources 210 are arranged at a first side of the transparent plate 100. The first set of light sources 210 are arranged to emit light (illustrated by the arrows) through the light guides 130 extending in the first direction 300.

A second set of light sources 220 are arranged at a second side of the transparent plate 100, wherein the second set of light sources 220 are arranged to emit light (illustrated by the arrows) through the light guides 140 extending in the second direction 400.

In one embodiment, all the light sources of the first and second sets of light sources 210, 220 emit light of the same color. In another embodiment, all the light sources of the first and second sets of light sources 210, 220 emit light of different colors. The skilled person realizes that several different embodiments are possible, e.g., not all light sources need to be turned on simultaneously and several different variations in color are possible.

Figure 2:
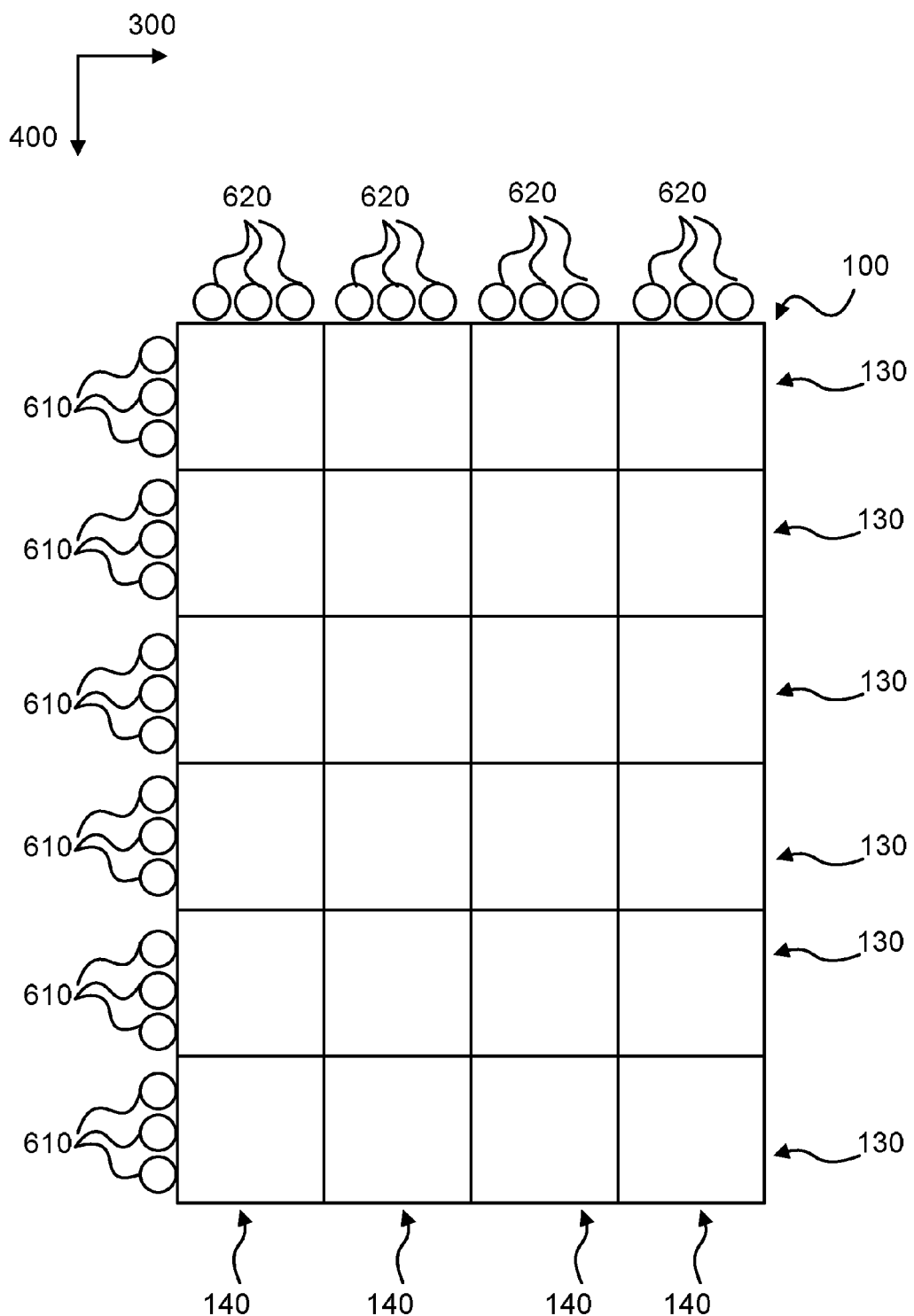
FIG. 2 is a schematic illustration of an embodiment of the inventive lighting device.

In one embodiment, more than one light source is arranged to emit light through every light guide. This is illustrated in FIG. 2. Light guides 130 extending in the first direction 300 are each associated with three light sources 610. Similarly, light guides 140 extending in the second direction 400 are each associated with three light sources 620. The three light sources can, e.g., emit light of different colors such as, e.g., red, blue, and green. The skilled person realizes that sometimes all three light sources 610, 620, are turned on, sometimes none of the three light sources 610, 620, and sometimes one or two of them. Furthermore, the intensity of light emitted from the three light sources 610, 620, may be varied.

The light sources 210, 220, 610, 620 can comprise at least one light emitting diode.

Figure 3:
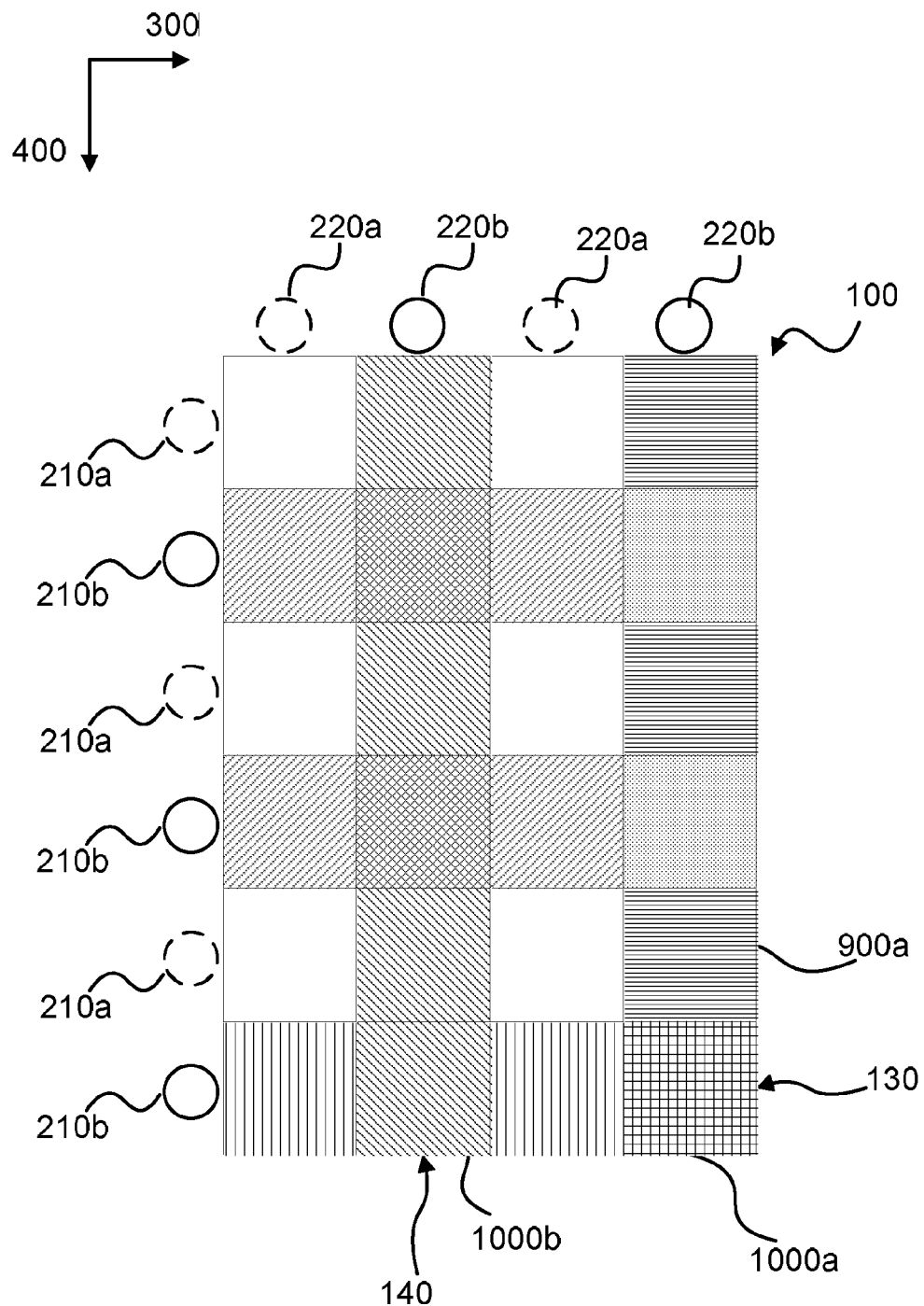

FIG. 3 illustrates the embodiment of FIG. 1 of the lighting device but with some of the light sources turned on. The light sources 210a are not turned on and the light sources 210b are turned on. Similarly, the light sources 220a are not turned on but the light sources 220b are turned on.

Light travelling from, e.g., light sources 210b, through light guides 130 in the first direction 300 is mixed with light travelling from light sources 220b, through light guides 140 in the first direction 400. Such mixing occurs, e.g. in cell 1000a and cell 1000b. In, e.g., cell 900a no mixing occurs since the corresponding light source 210a is not turned on. In this way, different colors can be obtained in different parts of the transparent plate.

Figure 4:
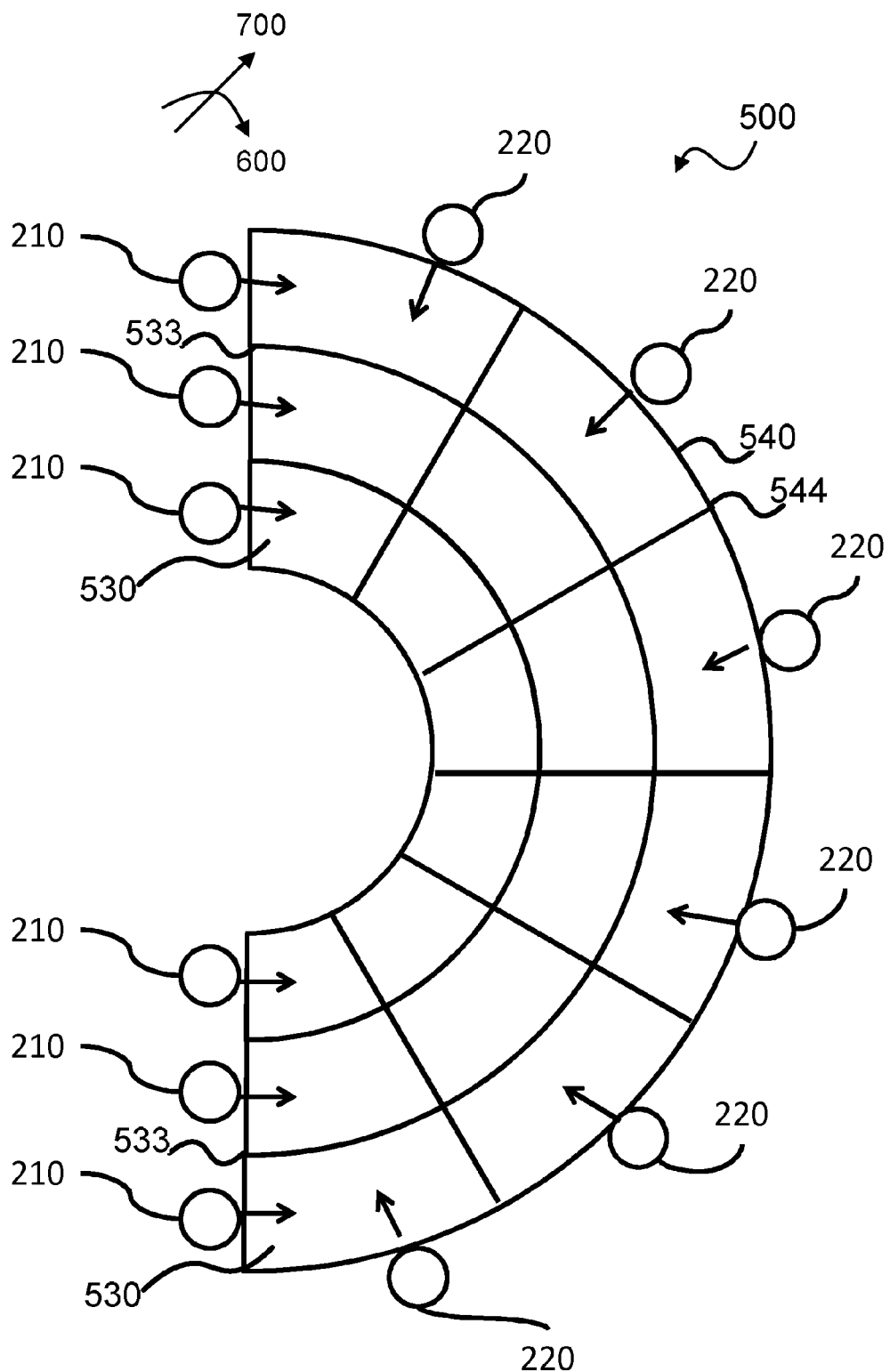
FIG. 4 is a schematic illustration of an embodiment of the inventive lighting device.

FIG. 4 is a schematic illustration of an embodiment of the inventive lighting device. A transparent plate 500 is illustrated. The transparent plate 500 can be made of, e.g., glass, silicon or plastic. The plastic used can be a transparent thermoplastic such as, e.g., poly(methyl methacrylate), PMMA. This particular transparent plate 500 is semicircular.

The transparent plate 500 has a plurality of light guides 530 extending in a first direction 600, wherein each light guide 530 is delimited by slits 533 extending in the first direction 600. The first direction 600 is in this particular embodiment parallel to a perimeter of the transparent plate 500. Furthermore, the transparent plate 500 has a plurality of light guides 540 extending in a second direction 700, wherein each light guide 540 is delimited by slits 544 extending in the second direction 700. The second direction 700 is in this particular embodiment parallel to a radius of the transparent plate 500. The plurality of light guides 530 extending in the first direction 600 and the plurality of light guides 540 extending in the second direction 700 intersect.

A first set of light sources 210 are arranged at a first side of the transparent plate 500. The first set of light sources 210 are arranged to emit light (illustrated by the arrows) through the light guides 530 extending in the first direction 600.

As can be seen in FIG. 4, the first set of light sources 210 comprises a first and a second group. In some embodiments, the first set of light sources 210 comprises only one of the groups.

A second set of light sources 220 are arranged at a second side of the transparent plate 500, wherein the second set of light sources 220 are arranged to emit light (illustrated by the arrows) through the light guides 540 extending in the second direction 700.

In one embodiment, all the light sources of the first and second sets of light sources 210, 220 emit light of the same color. In another embodiment, all the light sources of the first and second sets of light sources 210, 220 emit light of different colors. The skilled person realizes that several different embodiments are possible, e.g., not all light sources need to be turned on simultaneously and several different variations in color are possible.

Figure 5:
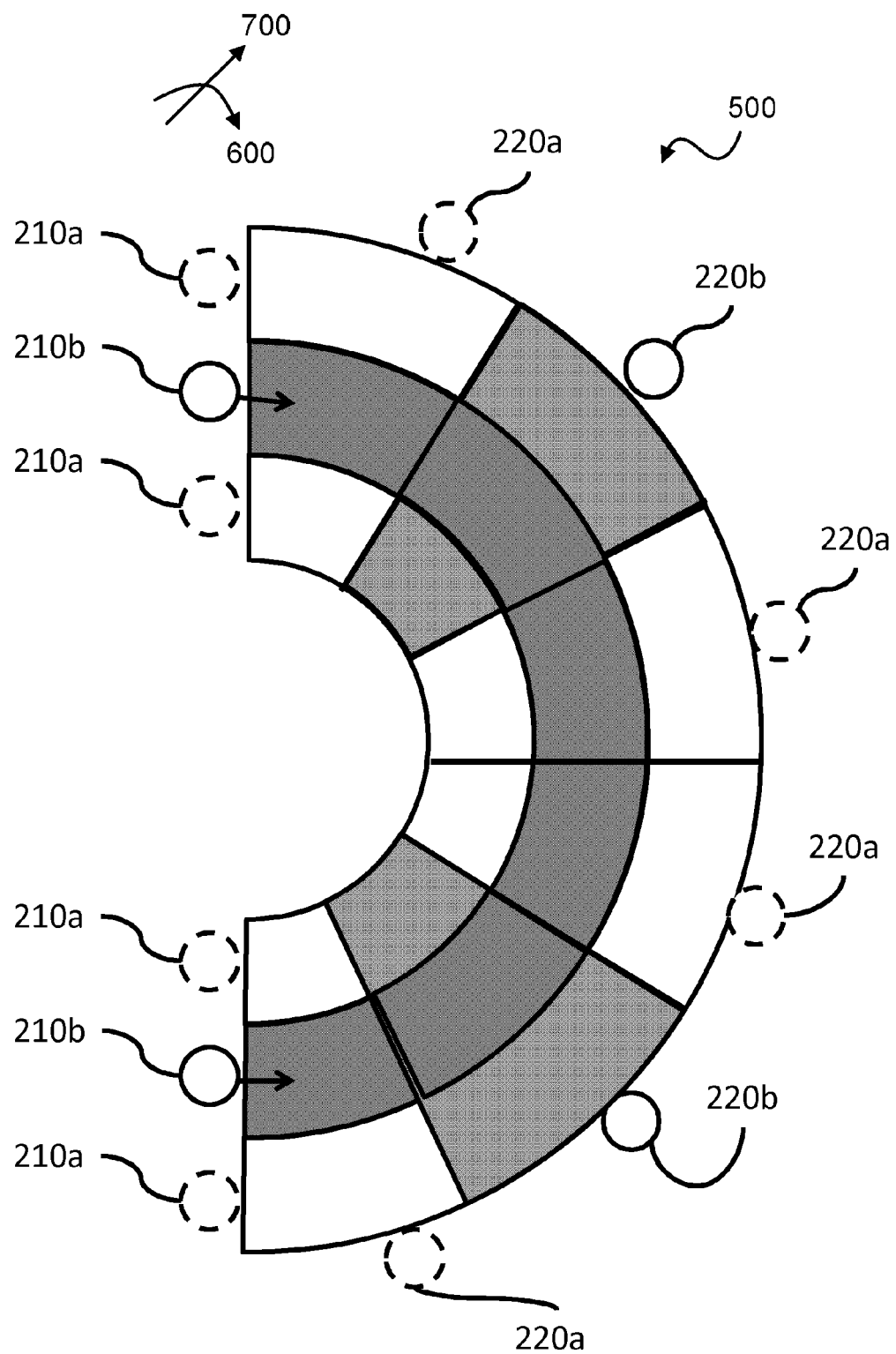

FIG. 5 illustrates the embodiment of FIG. 4 of the lighting device but with some of the light sources turned on. The light sources 210*a* are not turned on and the light sources 210*b* are turned on. Similarly, the light sources 220*a* are not turned on but the light sources 220*b* are turned on.

Light travelling from, e.g., light sources 210*b*, through light guides 530 in the first direction 600 is mixed with light travelling from light sources 220*b* through light guides 540 in the first direction 700. In this way, different colors can be obtained in different parts of the transparent plate.

In the following, a method of providing a lighting device will be described. Slits extending in a first direction in a transparent plate are cut using a laser. Each pair of slits delimits a respective light guide extending in the first direction.

Slits extending in a second direction are cut, using a laser, in the transparent plate such that the plurality of light guides extending in the first direction and the plurality of light guides extending in the second direction intersect. Each pair of slits delimits a respective light guide extending in the second direction. The second direction may be orthogonal to the first direction.

A first set of light sources are arranged at a first side of the transparent plate so that the first set of light sources emit light through the light guides extending in the first direction.

A second set of light sources are arranged at a second side of the transparent plate so that the second set of light sources emit light through the light guides extending in the second direction.

In summary, the disclosed embodiments relate to functional and decorative lighting. A transparent body 100 comprises a plurality of light guides 130, 140 forming a matrix. Light is emitted from light sources 210, 220. In the cells of the matrix in which light from different light sources 210, 220 intersects, the light is mixed which results in different cells having different colors.

While the invention has been illustrated and described in detail in the drawings and foregoing description, such illustration and description are to be considered illustrative or exemplary and not restrictive; the invention is not limited to the disclosed embodiments.

For example, it is possible to operate the invention in an embodiment where the shape of the transparent plate is at least one of cubic, spherical, tetrahedral, icosahedral, parallelepipedal, octahedral, quadratic, rectangular, circular, elliptical or any other possible shape.

Instead of a transparent plate, the lighting device may comprise a transparent body extending in the first, second and third directions. The lighting device may further comprise a plurality of light guides extending in the third direction, wherein each light guide is delimited by slits extending in the third direction, and a third set of light sources arranged at a third side of the transparent body, wherein the third set of light sources are arranged to emit light through the light guides extending in the third direction.

Furthermore, a top surface of the transparent plate can have an out-coupling structure. The out-coupling structure may be realized as a plurality of small dots. These dots can cover the transparent plate totally or partly. The dots can be made using, e.g., silkscreen printing or sandblasting. The dots are arranged for coupling the light travelling within the light guides out of the light guides.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

This invention claimed is:

1. A lighting device comprising:
  a transparent body having a plurality of light guides extending in a first direction, wherein each light guide is delimited by slits extending in the first direction, and a plurality of light guides extending in a second direction, wherein each light guide is delimited by slits extending in the second direction, wherein the plurality of light guides extending in the first direction and the plurality of light guides extending in the second direction are arranged to intersect thereby forming intersections,
  a first set of light sources arranged at a first side of the transparent body, wherein the first set of light sources are arranged to emit light through the light guides extending in the first direction, and
  a second set of light sources arranged at a second side of the transparent body, wherein the second set of light sources are arranged to emit light through the light guides extending in the second direction, wherein light from the first set of light sources and light from the second set of light sources intersect in the intersections formed by the plurality of light guides extending in the first direction and the plurality of light guides extending in the second direction, wherein the first direction is parallel to a perimeter of the transparent body and the second direction is parallel to a radius of the transparent body, or wherein the first direction is orthogonal to the second direction and the third direction is orthogonal to the first direction and to the second direction.

2. The lighting device according to claim 1, further comprising:

a plurality of light guides extending in a third direction, wherein each light guide is delimited by slits extending in the third direction, and a third set of light sources arranged at a third side of the transparent body, wherein the third set of light sources are arranged to emit light through the light guides extending in the third direction.

3. The lighting device according to claim 1, wherein the transparent body (100, 500) is made of at least one material from the group of glass, silicon and plastic.

4. The lighting device according to claim 1, wherein the shape of the transparent body is at least one of the group of cubic, spherical, tetrahedral, icosahedral, parallelepipedal, octahedral, quadratic, circular, triangular, elliptical, and rectangular.

5. The lighting device according to claim 1, wherein at least a subset of the first set of light sources, the second set of light sources, and the third set of light sources are arranged to emit light of at least one color.

6. The lighting device according to claim 1, wherein the first side of the transparent body is parallel to the second direction and wherein the second side of the transparent body is parallel to the first direction.

7. The lighting device according to claim 1, wherein each of the light sources of the first and second sets of light sources comprises at least one light emitting diode.

8. The lighting device according to claim 1, wherein the transparent body comprises an out-coupling structure for coupling the light emitted through the light guides out of the transparent body.

* * * * *